United States Patent [19]

Miller

[11] Patent Number: 5,736,481
[45] Date of Patent: Apr. 7, 1998

[54] SHAPED LIGNOCELLULOSIC-BASED ACTIVATED CARBON

[75] Inventor: James R. Miller, Mt. Pleasant, S.C.

[73] Assignee: Westvaco Corporation, New York, N.Y.

[21] Appl. No.: 716,105

[22] Filed: Sep. 19, 1996

Related U.S. Application Data

[63] Continuation-in-part of Ser. No. 609,632, Mar. 12, 1996.

[51] Int. Cl.$^6$ ............................. B01J 21/18; B01J 20/02
[52] U.S. Cl. ......................... 502/174; 502/416; 502/418; 502/423; 502/428; 502/507
[58] Field of Search ............................. 502/174, 180, 502/182, 416, 418, 423, 428, 429, 507, 402

[56] References Cited

U.S. PATENT DOCUMENTS

| | | | |
|---|---|---|---|
| 1,478,987 | 12/1923 | Morrell | 502/429 |
| 3,864,277 | 2/1975 | Kovach | 502/423 |
| 3,901,823 | 8/1975 | Dimitri et al. | 502/414 |
| 3,951,859 | 4/1976 | Inaba et al. | 502/62 |
| 3,960,761 | 6/1976 | Burger et al. | 502/429 |
| 4,051,098 | 9/1977 | Takemura et al. | 502/401 |
| 4,552,863 | 11/1985 | Fujimori | 502/418 |
| 4,664,683 | 5/1987 | Degen et al. | 502/402 |
| 4,677,086 | 6/1987 | McCue et al. | 502/413 |
| 5,073,454 | 12/1991 | Graham | 428/403 |
| 5,250,491 | 10/1993 | Yan | 502/424 |
| 5,389,325 | 2/1995 | Bookbinder et al. | 264/117.12 |
| 5,538,932 | 7/1996 | Yan et al. | 502/424 |

*Primary Examiner*—Elizabeth D. Wood
*Assistant Examiner*—Patricia L. Hailey
*Attorney, Agent, or Firm*—Terry B. McDaniel; Daniel B. Reece, IV; Richard L. Schmalz

[57] ABSTRACT

Extruded pellets comprising a majority of activated carbon particles and an organic binder provide improved performance when processed through tumbling equipment while the pellets are in their "green" state, i.e., pellets which are fresh off the extruder and contain activated carbon, binder, and water and have not been subjected to any thermal processing (drying). The tumbling action both smoothes the pellets (by closing any cracks and greatly improving appearance) and increases the density of the pellets, e.g., by increasing particle density and reducing voids between the pellets. Improved performance results from an ability to increase the weight of carbon pellets which can be packed into a fixed volume and thereby increase the volumetric working capacity of the bed for adsorbing/desorbing vapors. Another benefit is to greatly reduce the levels of dust associated with the carbon, both the initial dust and the dust of attrition.

15 Claims, 2 Drawing Sheets

SHAPED LIGNOCELLULOSIC-BASED ACTIVATED CARBON

This application is a continuation-in-part of application Ser. No. 08/609,632, filed Mar. 12, 1996.

BACKGROUND OF THE INVENTION

1. Field of the Invention

This invention relates to an active carbon pellet prepared by extruding activated lignocellulosic-based carbon with a binder material. More particularly, the invention relates to an improved active carbon pellet characterized by low void volume and low dust attrition.

2. Description of the Prior Art

Granular carbons and carbon pellets are typically used in columns or beds for gas and vapor systems as well as for processing a number of liquids. Such carbons have been used in canisters in automobiles through which gasoline tank and carburetor vapors are directed prior to release to the environment. To qualify for this application, a carbon must possess sufficient mechanical strength to withstand the abrasion incident to continued use.

There generally is a direct correlation between the mechanical strength of the granular activated carbon product and the mechanical strength of its precursor raw material. Thus, coal-based active carbon generally exhibits a high mechanical strength and density; whereas, lignocellulosic-based active carbons, derived from a much "softer" precursor relative to coal, generally exhibit low mechanical strengths and densities.

Also, gas-adsorbing carbons should be as dense as is consistent with high adsorption capacity so as not to require a large space for the adsorber. The development of high adsorption capacity during thermal activation, however, is accompanied by a loss of mechanical strength and density; therefore, some compromise is required in selecting the degree to which the activation is conducted. So, with lignocellulosic precursors (or, for lignocellulosic-based active carbons), the problem is compounded.

Several approaches have been taken to address the problem of low mechanical strength and density of lignocellulosic-based active carbons. In U.S. Pat. No. 3,864,277, Kovach emphasizes the binder additive in teaching the phosphoric acid activation of wood, straw, or low-rank brown coals in the presence of a carbonaceous binder material such as lignosulfonates and polyvinyl alcohol, followed by forming solid granular shaped particles from the mixture, and heat-treating at less than 650° C. to give a granular product having a ball-pan hardness of greater than 85%. Given the teaching of Kovach and employing the knowledge of the relationship of precursor mechanical strength and density with those characteristics of the active carbon product, MacDowall (in U.S. Pat. No. 5,162,286) teaches increasing lignocellulosic-based active carbon density by the use of young carbonaceous vegetable products high (>30%) in natural binding agent, such as nut shell, fruit stone, almond shell, and coconut shell, as precursors for treatment with phosphoric acid followed by carbonization.

A third approach, which relates to the present invention, is taught by McCue et al. in U.S. Pat. No. 4,677,086. To achieve, in a wood-based active carbon, the mechanical strength and product density approaching that achieved with coal-based products, McCue et al. teach extruding an active wood-based carbon with bentonite clay, followed by calcining the extruded active carbon/clay pellets. This technology has been the basis for the commercial products NUCHAR® BAX-950 and NUCHAR® BAX-1100 marketed by Westvaco Corporation.

In addition to gas column (or, packed bed) requirements for high mechanical strength and high density, it is also desirable to reduce the bed void volume in order to maximize the carbon content of the bed, and subsequently maximize the adsorptive capacity. This is primarily determined by the shape of the granular or pellet carbon. In fact, because of the irregular shape of granular carbon, regularly shaped carbon pellets are preferred for their better "packing." However, as a result of uneven cutting of the extrudate to form the pellets, the pellets are usually irregularly shaped, and fissures and cavities often appear along the pellet surface. This creates two problems. The resulting irregularities in shape prevent optimization of bed (or column) packing and detract from maximizing the carbon content for a given pellet volume. In addition, the surface irregularities are often removed from the pellet due to abrasion. These material losses, in addition to debris caused by cutting the pellets to size, present another problem: dust.

Besides having a product which may appear to disintegrate, attrited dust in a packed bed, such as a column or an automotive canister, can fill the bed voids to create high pressure drops and impede the flow-through of vapors to be treated. A particular problem in the automotive application is concern that the dust will act to interfere with various sensing devices connected to the canister to monitor performance.

Typically, dusting due to abrasion, or dust attrition, may be retarded or precluded by spraying a coating on the surface of the pellet. Invariably, this remedy is at the expense of butane working capacity; thereby providing another tradeoff for the working life of the active carbon material.

One solution to this recognized need is described in parent U.S. patent application Ser. No. 08/609,632, filed Mar. 12, 1996, and related U.S. patent application Ser. No. 08/613,270, filed Mar. 8, 1996, now U.S. Pat. No. 5,691,270, teaching an improved lignocellulosic-based activated carbon pellet of a smoother surface and more uniform shape which provides optimal bed packing and which exhibits increased density and is less susceptible to dust attrition and the method of its manufacture using an inorganic binder material. That invention represents an improvement of that disclosed in U.S. Pat. No. 4,677,086, based on bentonite clay as a binder for activated lignocellulosic-based carbon in an extrusion process. The parent ('632) and related ('270) applications teach tumbling the extruded pellet prior to heat treating to dry/calcine.

During the development of the improved active carbon pellet, it was surprisingly discovered that substitution of the inorganic clay binder with an organic binder material provided a dramatic reduction in both initial dust and dust attrition.

SUMMARY OF THE INVENTION

Figure 1:
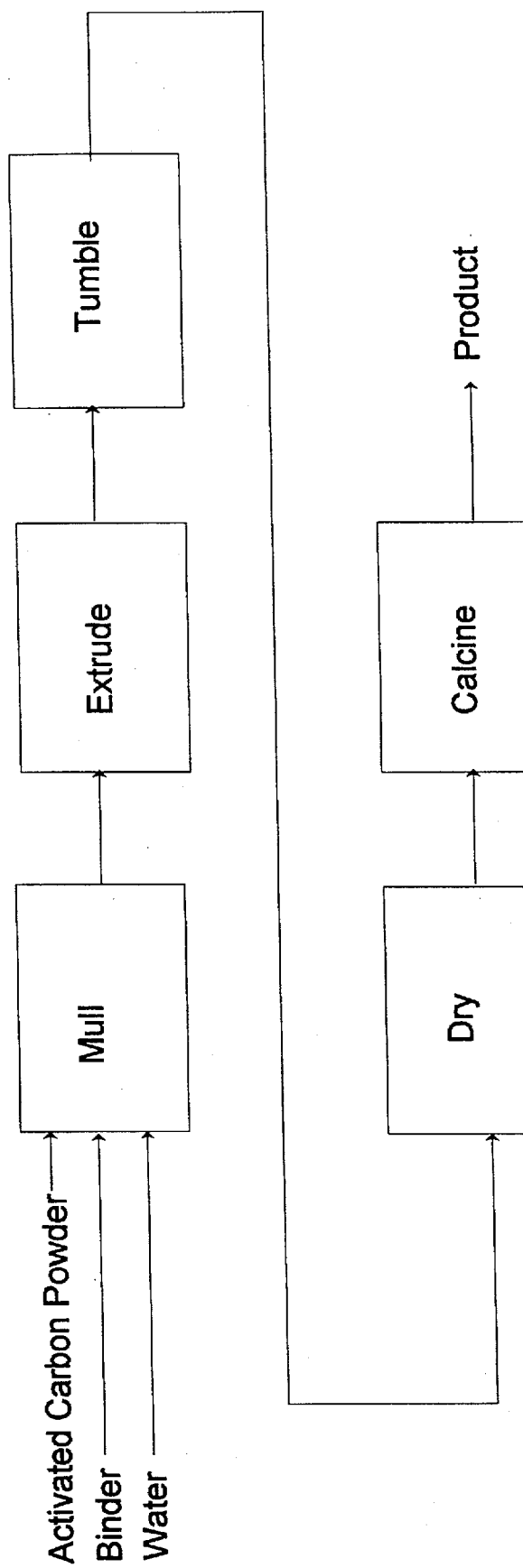
FIG. 1 shows a block flow diagram of the invention process wherein tumbling is carried out on the green extrudate, followed by drying and calcination.

The object of the invention is achieved in the discovery that extruded pellets comprising a major portion of activated carbon particles and a minor portion of organic binder provides improved performance when processed through tumbling equipment while the pellets are in their "green" state. Green pellets are those which are fresh off the extruder and contain activated carbon, binder, and water (from 50-70% water, by weight) and have not been subjected to any thermal processing (drying). The tumbling action both smoothes the pellets (by sealing, or otherwise closing, any cracks and greatly improving appearance) and increases the density of the packed bed e.g., by increasing particle density and reducing voids between the pellets. (Interestingly, debris caused by cutting the pellets to size is assimilated by the tumbling pellets.) Improved performance results from an ability to increase the weight of carbon pellets which can be packed into a fixed volume and thereby increase the volumetric working capacity of the bed for adsorbing/desorbing vapors. Another benefit is to greatly reduce the levels of dust associated with the carbon, both the initial dust and the dust of attrition.

DESCRIPTION OF THE PREFERRED EMBODIMENT(S)

The process steps for the alternative embodiments of the invention process are set forth in the drawings. The process steps are described in greater detail in the Examples which follow. Basically, the blend of activated lignocellulosic-based carbon, binder material, and water are mixed and then fed through an extrusion device. The generally continuous extrudate is cut at consistent intervals to produce a cylindrical pellet, relatively uniform in length and diameter.

The invention process improvement involves taking these "green" pellets, i.e., soon after they are generated (50-70% moisture content, by weight), and subjecting them to a tumbling process for a period of time sufficient to produce a pellet that, upon subsequent drying, exhibits a dust attrition rate of less than 0.75 mg/100 cc/minute. In particular, it has been found that the tumbling step is effective to provide the improved composition of the invention if it is performed in lieu of immediately drying the green pellets in additional equipment.

More specifically, the invention process for preparing an active carbon pellet comprises the steps of:

(a) grinding granular activated lignocellulosic-based carbon to a fine powder;

(b) mixing the activated lignocellulosic-based carbon powder with a lesser amount of an organic binder material selected from the group consisting of natural and synthetic resins in the presence of water;

(c) extruding the mixture to produce an extrudate which is cut to form green pellets are characterized by 50-70% moisture content, by weight;

(d) subjecting the green pellets to a tumbling operation for from about 1 to about 30 minutes;

(e) subjecting the pellets to sufficient heat to remove the moisture therefrom; and (f) heat treating the dried pellets at from about 700° F. to about 1800° F. in an inert atmosphere for a period from about 0.1 to about 1.0 hours, wherein the final active carbon pellets are characterized by a dust attrition rate less than 0.75 mg/100 cc/minute, in the absence of an applied coating on the pellet. This is the process illustrated in the flow diagram of FIG. 1.

Figure 2:
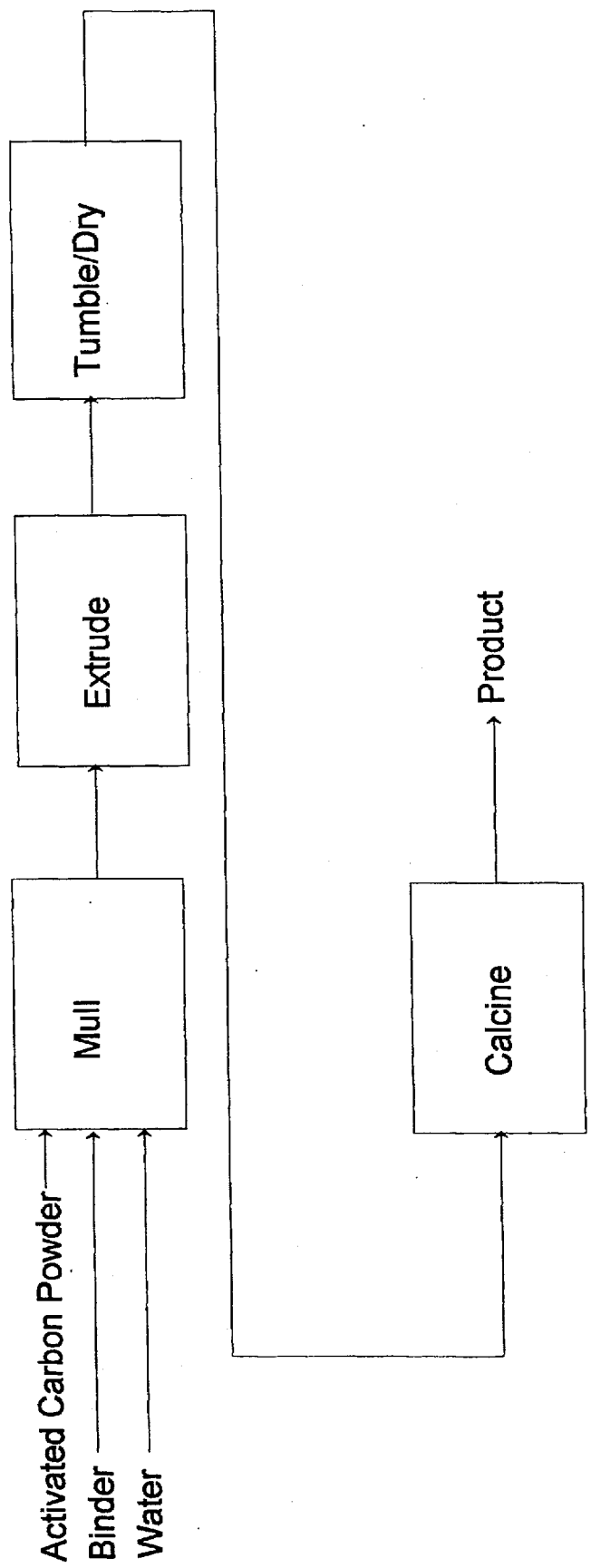
FIG. 2 shows a block flow diagram of the invention process whereby tumbling is carried out on the green extrudate as it is being dried, followed by calcination.

In an alternative embodiment of the invention process, as indicated in the flow diagram of FIG. 2, the tumbling operation may be conducted at sufficient temperatures and for a sufficient time to remove the moisture from the pellets, which can then be subjected to the heat treatment. Thus, steps (d) and (e) may be conducted concurrently in a single operation.

It is envisioned that the moisture level of the green pellets is important in the effectiveness of the tumbling step, and that a critical moisture level may exist below which densification and reduction of dust levels may not occur. As a result, in an additional embodiment of the invention, the tumbling equipment can also be used to dry the green pellets, if the drying rate is kept to a level low enough to give a sufficient residence time before the critical moisture level is reached. The critical moisture level is in the range of 50-70% water, by weight. A preferred moisture level is 55-65% water, by weight. The most preferred moisture level for the tumbling operation of the green pellets is 58-62% water, by weight.

The lignocellulosic material precursor to the lignocellulosic-based active carbon used in the invention process to form the invention composition is selected from the group of lignocellulosic materials consisting of wood chips, wood flour, sawdust, coconut shell, nut shells, fruit pits, kernal, olive stone, and almond shell.

The organic binder materials may include natural resins, such as wood rosin, gum rosin, or tall oil rosin based compounds, or synthetic resins, such as styrenic, acrylic, or phenolic based compounds (such as phenol-formaldehyde resin).

Due to the adhesive properties of these organic binders, some improvement in initial dust and dust attrition may be expected. However, the dramatic improvements achieved by the present invention were wholly unexpected and entirely surprising.

In the Examples to follow, the various analyses were performed in measurements determining the benefits of the invention product and process:

Apparent Density (AD)—ISO No. 960-050: weight of dry carbon per unit volume of the carbon bed;

Butane Working Capacity (BWC)—ISO No. 960-080: weight of butane purged from a sample of dried carbon after it had been saturated with butane per unit volume of the carbon bed;

Dusting Attrition (DA)—ISO No. 960-380: weight of dust attrited from a 100 ml sample of carbon per unit time;

Initial Dust (ID)—same as dusting attrition: weight of dust initially present on a 100 ml sample of carbon prior to attrition test;

Actual Pellet Density (APD); weight of dry carbon per unit volume of entire carbon pellet. Determined using mercury porosimetry;

Base Pellet Density (BPD); weight of dry carbon per unit volume of carbon pellet including only pore space less than 0.5 microns equivalent diameter. Determined using mercury porosimetry;

Bed Void Fraction (BVF): volume of space between carbon pellets per unit volume of carbon bed. Determined by the equation 1−(AD/APD); and Pellet Void Fraction (PVF) (pellet interparticle void fraction): volume of space within a carbon pellet including only pore space greater than 0.5 microns equivalent diameter per unit volume of entire carbon pellet. Determined by the equation 1−(APD/BPD).

The invention process and composition are further described in the following examples:

EXAMPLE 1

Ground lignocellulosic-based activated carbon was mixed with novalac resin (a phenolformaldehyde resin), carboxymethyl cellulose (CMC), and water in a Muller mixer. The dry basis novalac concentration was 10 wt %, and the dry basis CMC concentration was 5 wt %. The mixture was mulled until it reached a consistency which could be extruded. It was extruded in a single screw auger extruder through a die plate containing 2 mm holes and cut as it exited the die plate into "green" pellets ranging in length from 2-6 mm. The green pellets had a moisture content of approximately 60 wt % (wet basis). Following extrusion, a portion of the green pellets was taken and loaded into a rotating drum in order to tumble the pellets. The drum was angled above the horizontal to retain the pellets and rotated at 30 rpm for 2 hours. Following this, both portions of the pellets ("tumbled" and "not tumbled") were dried in a batch convection oven. The portion of green pellets which was not tumbled was dried in a batch convection oven. The two batches of dried pellets were heated separately to 1700° F. in a batch indirect-fired rotary furnace for 15 minutes. Following this calcination, they were discharged and cooled separately under a nitrogen purge prior to analysis.

The pertinent properties are shown in Table I.

TABLE I

| Batch I.D. | PD (g/cc) | BVF (%) | AD (g/cc) | ID (mg/100 cc) | DA (mg/100 cc/min) |
|---|---|---|---|---|---|
| X-96-0082 Not Tumbled | 0.639 | 40.0 | 0.3833 | 13.3 | 0.778 |
| X-96-0083 Tumbled | 0.668 | 36.7 | 0.4229 | 3.54 | 0.256 |

Initial dust decreased by 73% and dust attrition decreased by 67%. Also, particle density is improved (by its increase), as is the bed void fraction (by its decrease).

EXAMPLE 2

In an alternative embodiment of the invention process, ground lignocellulosic-based activated carbon was mixed with novalac resin (a phenol-formaldehyde resin), carboxymethyl cellulose (CMC), and water in a Muller mixer. The dry basis novalac concentration was 10 wt %, and the dry basis CMC concentration was 5 wt %. The mixture was mulled until it reached a consistency which could be extruded. It was extruded in a single screw auger extruder through a die plate containing 2 mm holes and cut as it exited the die plate into "green" pellets ranging in length from 2-6 mm. The green pellets had a moisture content of approximately 55 wt % (wet basis). Following extrusion, a portion of the green pellets was taken and loaded into a rotating drum in order to tumble the pellets. The drum was angled above the horizontal to retain the pellets and rotated at 30 rpm for 2 hours. During this time, the pellets were dried by blowing heated air into the rotating drum. The portion of green pellets which was not tumbled was dried in a batch convection oven. The two batches of dried pellets were calcined separately to 1700° F. in a batch indirect-fired rotary furnace for 15 minutes. Following calcination, they were discharged and cooled separately under a nitrogen purge prior to analysis.

The pertinent properties are shown in Table II.

TABLE II

| Batch I.D. | AD (g/cc) | ID (mg) | DA (mg/min) |
|---|---|---|---|
| 920-A-6 Not Tumbled | 0.432 | 9.35 | 0.815 |
| 920-A-5 Tumbled | 0.440 | 1.10 | 0.060 |

Initial dust decreased by 88% and dust attrition decreased by 92%.

As will be appreciated by those skilled in the art, the present invention may be embodied in other specific forms without departing from the spirit or essential attributes thereof; and, accordingly, reference should be made to the appended claims, rather than to the foregoing specification, as indicating the scope of the invention.

What is claimed is:

1. A process for preparing an active carbon pellet comprising the steps of:

(a) grinding granular activated lignocellulosic-based carbon to a powder;

(b) mixing a greater amount of the activated lignocellulosic-based carbon powder with a lesser amount of an organic binder material selected from the group consisting of natural and synthetic resins in the presence of water;

(c) extruding the mixture to produce an extrudate which is cut to form green pellets that are characterized by 50-70% moisture content, by weight;

(d) subjecting the green pellets to a tumbling operation for from about 1 to about 30 minutes;

(e) subjecting the pellets to sufficient heat for a sufficient time to remove the moisture therefrom to produce dried pellets; and (f) heat treating the dried pellets at from about 700° F. to about 1800° F. in an inert atmosphere for a period of about 0.1 to about 1.0 hours, wherein the final dried, heat-treated active carbon pellets are characterized by a dust attrition rate less than 0.75 mg/100 cc/minute, in the absence of an applied coating on the pellet.

2. The process of claim 1 wherein the binder material is selected from the group of natural resins consisting of tall oil rosin, gum rosin, and wood rosin.

3. The process of claim 1 wherein the binder material is selected from the group of synthetic resins selected from styrenic, phenolic, and acrylic based compounds.

4. The process of claim 1 wherein the binder material is present in an amount from about 5% to about 30%, by weight.

5. The process of claim 1 wherein step (e) is conducted at a temperature up to 700° F.

6. The process of claim 1 wherein step (f) is conducted at from about 1000° F. to about 1800° F.

7. The process of claim 1 wherein the tumbling operation is conducted as a batch process.

8. The process of claim 1 wherein the tumbling operation is conducted as a continuous process.

9. The process of claim 1 wherein the tumbling operation is conducted up to 15 minutes.

10. A process for preparing an active carbon pellet comprising the steps of:

(a) grinding granular activated lignocellulosic-based carbon to a fine powder;

(b) mixing a greater amount of the activated lignocellulosic-based carbon powder with a lesser amount of an organic binder material selected from the group consisting of natural and synthetic resins in the presence of water;

(c) extruding the mixture to produce an extrudate which is cut to form green pellets that are characterized by 50–70% moisture content, by weight;

(d) subjecting the green pellets to a tumbling operation at a sufficient temperature and for a sufficient time to remove the moisture therefrom to form dried pellets; and (e) heat treating the dried pellets at from about 700° F. to about 1800° F. in an inert atmosphere for a period of about 0.1 to about 1.0 hours, wherein the final active carbon pellets are characterized by a dust attrition rate less than 0.75 mg/100 cc/minute, in the absence of an applied coating on the pellet.

11. The process of claim 10 wherein the binder material is selected from the group of natural resins consisting of tall oil rosin, gum rosin, and wood rosin.

12. The process of claim 10 wherein the binder material is selected from the group of synthetic resins selected from styrenic, phenolic, and acrylic based compounds.

13. The process of claim 10 wherein the binder material is present in an amount from about 5% to about 30%, by weight.

14. The process of claim 10 wherein step (d) is conducted at from about 60° F. to about 700° F. for from about 1 to about 300 minutes.

15. The process of claim 10 wherein step (e) is conducted at from about 1000° F. to about 1800° F.

* * * * *